United States Patent Office 3,550,356
Patented Dec. 29, 1970

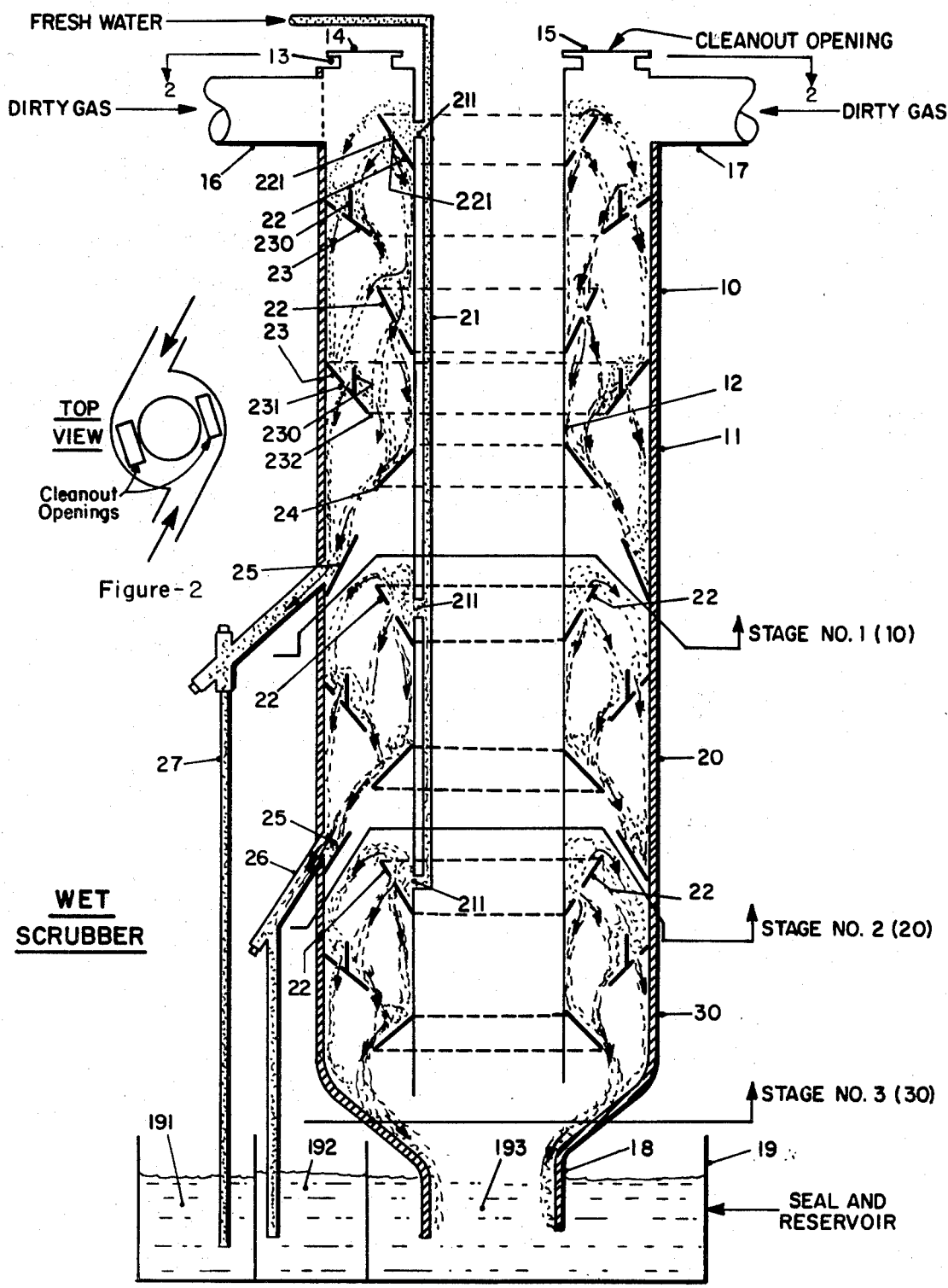

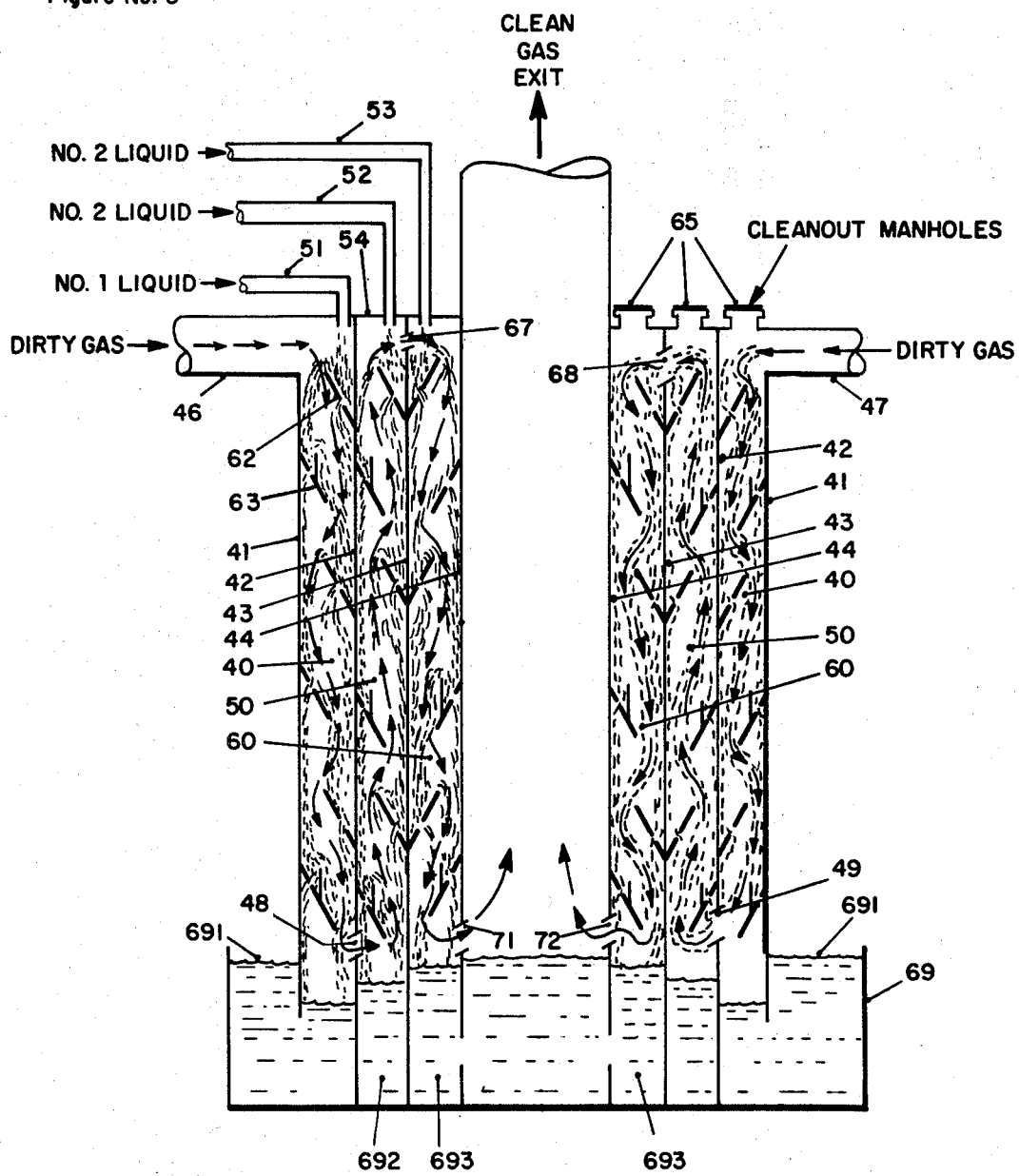

3,550,356
GAS PURIFICATION PROCESS AND APPARATUS
Harry I. Abboud, 5845 Clematis Drive,
Baton Rouge, La. 70808
Filed Jan. 5, 1968, Ser. No. 696,055
Int. Cl. B07d 47/10
U.S. Cl. 55—236
9 Claims

ABSTRACT OF THE DISCLOSURE

An apparatus for scrubbing aerosols, fumes, or finely divided solids, from industrial gases. In particular, a device is provided wherein a substantially downwardly flowing concentric layer, sheet, or generally continuous film of liquid is tangentially and intimately contacted with swirling aerosol-laden gases (dirty gases) to denude or clean the latter and deposit solids within the liquid. In the preferred apparatus, one or more stages are provided to achieve the desired liquid gas contact. A stage is characterized by an outer tubular shell with one or more tangential dirty gas inlets located within the tubular shell. A relatively small diameter inner tubular shell, mounted concentrically within the outer shell, provides an outlet conduit for scrubbed gases, and a space for water inlet means, if desired. Perforated frustoconic or bowl-shaped lisuid distributor plates and troughs are mounted within the annular space provided between the tubular members, these providing means for passage of liquid downwardly along the inside walls of the outer tubular member for contact with tangentially entering dirty gases. The tangential inlets can be provided at the top or at the bottom of the said outer tubular shell, and hence the entering gases can flow concurrently or countercurrently with the entering liquid.

---

The art is replete with wet scrubbing devices of various designs. Most conventional designs leave much to be desired for one or more reasons, infra. High pressure drops and high power requirements, with concurrent low efficiency, is commonplace. The designs, or the auxiliary equipment, or both, are often too complex, thus requiring undue maintenance and high capital costs. Proper liquid supply and distribution, as well as slurry disposal is often a source of major difficulties. For example, high susceptibility to pluggage results in poor performance and causes high maintenance and cleaning costs.

There is an acute need for more efficient, and simple, industrial gas cleaning devices. The problems of air pollution, particularly in the metropolitan areas of this country, are growing at an alarming rate. It is a basic objective of the present invention to fulfill this need, and to advance the general state of the art.

The primary objective of the present invention is thus to obviate many of the foregoing and other prior art difficulties. In particular, it is an object to provide improved process and apparatus for the wet scrubbing and cleaning of impurities, i.e., aerosols, fumes, or finely divided solids, from industrial gases. More particularly, it is an object to provide process and apparatus for wet scrubbing dirty gases at high efficiency. Yet more particularly, it is an object to provide a highly efficient, yet simple, form of apparatus for the cleaning of such gases.

These objects, and others, are achieved in accordance with the present invention, which contemplates a process comprising flowing a concentric layer, sheet or substantially continuous film of liquid generally downwardly while tangentially contacting the liquid with swirling aerosol-laden gases, fumes, or finely divided solids, to denude or clean the latter and deposit solids or fumes within the liquid. Preferably, a plurality or sequence of such wet scrubbing steps is employed, this sequence being followed by repetition of the sequence by contact of the partially clean or denuded gas with a fresh similar or dissimilar liquid. In the total effect, the gas and liquid move concurrently or countercurrently.

In preferred apparatus, one or a plurality of stages is provided to achieve the desired liquid gas contact. A stage is characterized by a pair of concentric vertically mounted tubes, a larger diameter tube provided with one or a plurality of tangential dirty gas inlets, and an inner smaller diameter tube which leaves an annular space between the tubes wherein frustoconic or bowl-shaped perforated distributor plates and troughs are mounted, these providing means for passage of gas and means to aid in the distribution of liquid along the inside walls of the outer tube. The scrubbed gases exit from the stage or, after passage through another stage or stages, exit into an inner tubular member which serves as a clean gas outlet.

The invention will be better understood by reference to the following detailed description and to the attached drawings to which reference is made as the description unfolds.

In the drawings:

FIG. 1 depicts a sectional elevation view of apparatus of preferred type, viz, on installation embodying a plurality of stacked stages, each stage as well as the combination embodying the present invention. The stages are constructed in series and operated in series, except as regards liquid flow.

FIG. 2 depicts a cross section along line 2—2 taken through the top stage of the installation.

FIG. 3 depicts a sectional elevation view of apparatus constructed in parallel and operated in series.

Referring to FIG. 1, there is shown a vertical installation providing several stages, in this instance three in number—viz, 10, 20, 30—each stacked one atop the other. The several stages 10, 20, 30 are serially connected with regard to gas flow, and connected in parallel as regards ingress and egress of liquids. The entering dirty gas thus flows from the top to the bottom of the installation, but fresh liquid is charged into and withdrawn from each of the stages to effect more efficient cleaning of the gas.

The most preferred apparatus for treating gases containing aerosols and finely divided solids is comprised of two concentrically disposed tubular members, an outer shell 11 of relatively large diameter, and an inner shell 12 of relatively small diameter. The outer tubular shell or wall 11 is enclosed by means of a cover 13, but is optionally provided with cleanout openings 14, 15. The top stage 10 is also provided with a plurality, in this instance two, tangential dirty gas inlets 16, 17.

The bottom portions of the outer tubular shell or wall 11 is, for convenience, diverged inwardly and fitted with a smaller diameter portion 18 which opens into a liquid seal reservoir 19, the function of which is to pass liquid while preventing escape of gas through the seal. The inner tubular shell or wall 12 terminates short of the divergent portion 18 and liquid seal reservoir 19 to permit passage of gas through the inner tubular members 12. A conduit 21 is conveniently located within inner tubular member 12 for supplying liquid through perforations or openings within the wall to the annular space between outer and inner tubular members 11, 12.

A series of generally frusto conic shaped sections or perforated bowl-shaped plates 22 is located within the annular space between outer and inner tubular members 11, 12. For convenience, these plates 22 can be externally mounted upon the inner tubular shell 12. The plates 22 are spaced sufficiently far from the inner surface of wall 12 to permit downflow of gas, and are perforated or otherwise arranged to aid in the distribution of liquid along the outer walls of tubular member 12 and inner walls of outer tubular member 11. Overflow troughs 23 are alternately spaced between the plates 22 within the annular space. The troughs 23 can be mounted circumferentially upon the inside of wall 11, or attached to the outer surface of wall 12, or both, to aid in distributing water along inside wall 11 and the outside of wall 12.

In a typical arrangement, the smaller diameter ends of a series of open end frusto conic shaped members 22 are turned downwardly and tightly fixed in place against the external wall 12 of the inner tubular member. The upper wider diameter ends of the members 22 are left open for receipt and overflow of liquid therefrom. Suitably, the members 22 are also provided with perforations 221 for downward passage of liquids.

Overflow troughs 23 are located below, and alternately disposed between the overflow members 22. The troughs 23 are open end, baffled, larger diameter plates, also of frusto conic shape. In mounting these plates 23 within the annular space, the larger diameter baffled side of the plate faces upwardly. The troughs 23 are conveniently affixed upon the inside of wall 11, no physical contact being provided with wall 12. The upper faces of the troughs 23 are provided with baffles or weirs 230 and perforated openings 231 through which liquid and gas can descend down the inside wall 11. Liquid overflowing weirs 230 of troughs 23 is projected onto the outer wall surface 12 and into the top of adjacent smaller diameter plates 22. Liquid overflowing members 22 is projected against the wall 11, pouring downwardly through openings 231 of members 23 while a portion of liquid passes downwardly through openings 232 of members 23 to fill a succeeding member 22.

At the very bottom of each stage is provided a liquid deflection member 24. This member 24 is also conveniently an open-end frusto conic shaped member with its smaller end facing upwardly and fitted tightly against wall 12, to cast or deflect descending liquid outwardly into a trough 25 from which dirty liquid is withdrawn. The trough 25 is, conveniently, an apron, lip or weir which is affixed to wall 11 and extends inwardly to form a receptacle for liquid. Dirty liquid from stages 1 and 2 is passed via conduits 26, 27, and from stage 3 via divergent portion 18, to the liquid seal and reservoir 19. The liquid seal and reservoir 19 are optionally divided into separate compartments 191, 192, 193 so that different liquids can be used in the different stages, if desired.

In operation, fresh liquid, e.g., water, is continuously injected into the annular space between tubular members 11, 12 via line 21, the water entering into the initial members 22 of the series via openings 211 within wall 12. Water overflows the top of members 22 and is cast or projected against the wall 11, and into troughs 23, the water pouring also as a continuous film or layer through openings 221 to fill succeeding members 22. Water pours through the openings 231 of troughs 23, and downwardly along the wall 11. Simultaneously, dirty gas is introduced through inlets 16, 17, the swirling gas descending downwardly through the openings 232 and along the inside of wall 11. The centrifugal action forces solids toward the wall 11 and into contact with the liquid. This results in intimate contact between the gas and the continuous liquid phase so that solids are transferred to the liquid. A liquid-solids slurry is withdrawn from the first stage 10 via conduit 27, the partially clean gas continuing to swirl downwardly to enter the second stage 20 into which fresh water or other liquid is injected. The same wet scrubbing action is continued from one stage to the next of the series, liquid slurry being withdrawn from the bottom of each stage while the cleaned or denuded gas is passed to the next stage and again into contact with fresh liquid. In this instance, since only three stages are shown, slurry is withdrawn from the second stage via conduit 26 and the partially cleaned gas is passed to the third stage. The liquid solids-slurry formed in the third stage is withdrawn via divergent portion 18 and the cleaned gas ascends through the gas outlet formed by tubular member 12. The cleaned gas can be manifolded and stored via means not shown for further use, or otherwise safely disposed of. Slurry from the seal reservoir can be intermittently or continuously changed or disposed of.

Another preferred embodiment is shown by reference to FIG. 3. In this structure all of the tubular members 41, 42, 43, 44 are vertically disposed one inside the other to form the several stages, in this instance again three in number—viz, 40, 50 and 60. The top of the structure is closed by a wall 54, and cleanout holes 65 are optionally provided. Similar, or dissimilar, liquids can be separately introduced into stages 40, 50, 60 via the conduits 51, 52, 53 to fill the perforated plates 62 and overflow troughs 63, the structure and function of which are similar to those devices 22 and 23 described by reference to FIG. 1. A liquid seal and reservoir 69 is provided, separately compartmented if desired into compartments 691, 692, 693 so that different liquids can be used in the different stages. Dirty gas can be introduced via tangential inlets 46, 47 to swirl downwardly within stage 40. In its descent, the solids are thrust against the wetted wall surface 41 to deposit solids within the liquid. At the bottom of stage 50 the partially cleaned gases enter tangential inlets 48, 49 to ascend, in total effect, conutercurrently to the flow of liquids. The gases are further cleaned within this stage 50 by contact with wetted wall surface 42. The gases exit from stage 50 and enter into stage 60 via tangential inlets 67, 68 to swirl downwardly against the inside wetted wall surface 43. The cleaned gas exits from stage 60 via the openings 71, 72 into the tubular member 44 which is a clean gas outlet.

It is apparent that various modifications can be made without departing the spirit and scope of the invention.

A lesser or larger number of stages can be employed dependent upon the amount of solids to be removed from the gases, and the conditions of operation. In general, however, it is desired to employ from about three to about six stages. Also, the stages need not be stacked one atop the other but can be spaced apart and arranged as independent vessels. In this instance, the partially cleaned gas would be sequentially transferred to the second, third and additional stages (as may be desired) and thence removed from the last stage. The liquid could be flowed downwardly and distributed along a wall as described, and gas introduced tangentially into each succeeding stage near the top or bottom of the vessel, as desired. Preferably, however, the gas would flow concurrent with the liquid through the individual stages.

Within the individual stages a greater or lesser number of liquid distribution plates, of similar or dissimilar shape, can be employed so as to lengthen or shorten the time of contact within an individual stage.

Other obvious modifications are also possible without departing the spirit and scope of the invention.

Having described the invention, what is claimed is:

1. Apparatus for wet scrubbing a solids-laden gas by sequential contact thereof with clean liquid in a series of stages comprising:

a pair of tubular members with walls of different diameters vertically concentrically disposed, the smaller diameter member disposed coaxially within the larger to define an annular space between the walls of the tubular members, a top wall extending between said tubular members and closing the top of the annular space, liquid inlet means to the annular space, series of open centered frusto conic shaped plates of two different diameters concentrically mounted on the walls of the tubular members and within the annular space, a first series of large diameter plates which impinge on the wall of the larger diameter tubular member, the small diameter end of each plate facing downwardly while the larger diameter end of each plate is faced upwardly, each of said large plates being partitioned on its upwardly faced side by weirs which form troughs, for receipt of liquid, and aperture means within the bottoms of said troughs, a second series of small diameter plates alternately disposed within the annular space relative to the larger plates, the smaller diameter end of each plate facing downwardly and abutting the wall of the inside tubular member while the larger diameter end of each plate is faced upwardly to form troughs, and aperture means within the bottoms of said troughs, so that overflowing liquid from the smaller diameter plates is projected against the wall of the outer tubular member to fill the troughs of the larger plates, while a portion of the liquid passes downwardly through the aperture means to fill a succeeding smaller diameter plate, and liquid from the aperture means within the larger diameter plates flows downwardly as a continuous film along the surface of the outer wall of the tubular member, a tangential gas inlet near the enclosing top wall leading into the annular space through which a swirling solids-laden gas is directed while liquid is poured downwardly as a continuous film along the outside wall of the tubular member whereat the swirling gas is contacted and denuded of solids, a means for separating solids-bearing liquid from the denuded gas prior to passage and contact of the swirling gas with fresh liquid in a subsequent stage.

2. The apparatus of claim 1 wherein the means for separating solids-bearing liquid from the denuded gas between the liquid scrubbing stages is constituted of the combination of a liquid deflection member comprising a first open centered frusto conic shaped plate mounted upon the wall of the inner tubular member with its smaller end facing upwardly and fitted tightly against said wall, a trough formed by a second and larger open centered frusto conic shaped plate mounted upon the wall of the outer tubular member with its larger end facing upwardly to receive liquid deflected thereto by the said deflection member, and a conduit for removing the ditry liquid from said trough.

3. The apparatus of claim 2 wherein a series of at least two fresh liquid scrubbing stages are provided by the combination of said deflection members, trough and conduit.

4. The apparatus of claim 1 wherein the inner tubular member is of shorter length than the outer tubular member, both members are open at their lower ends, and the open end of the inner tubular member terminates short of the open end of the outer tubular member, the outer tubular member, but not the inner tubular member, is immersed within the liquid of a liquid-filled vessel providing a liquid seal and reservoir which retains the solids and directs the flow of denuded gas upwardly into the inner tubular member.

5. Apparatus for wet scrubbing a solids-laden gas by sequential contact thereof with clean liquid in a series of stages comprising at least three tubular members with walls of different diameters vertically concentrically disposed, a smaller diameter tubular member disposed coaxially within a larger tubular member to define annular spaces, these constituting stages between the walls of adjacent tubular members, a top wall extending between said tubular members and closing the top of the annular spaces, liquid inlet means into each of the annular spaces, series of open centered frusto conic shaped plates of two different diameters concentrically mounted on the walls of the tubular members and within the tubular spaces, a first series of large diameter plates which impinge on the wall of the larger diameter tubular member, the small diameter end of each plate facing downwardly while the larger diameter end of each plate is faced upwardly, each of said large plates being positioned on its upwardly faced side by weirs which form troughs, for receipt of liquid, and aperture means within the bottoms of said troughs, a second series of small diameter plates alternately disposed within the annular spaces relative to the larger plates, the smaller diameter end of each plate facing downwardly and abutting the wall of the inside tubular member while the larger diameter end of each plate is faced upwardly to form troughs, and aperture means within the bottoms of said troughs, so that overowing liquid from the smaller diameter plates is projected against the wall of an outer tubular member to fill the troughs of the larger plates, while a portion of the liquid passes downwardly through aperture means to fill a succeeding smaller diameter plate, and liquid from the aperture means within the larger diameter plates flows downwardly as a continuous film along the surface of an outer wall of the tubular member, tangential gas inlets, alternately disposed at the top and bottom, respectively, of the tubular members so that an entering gas passes from one annular space between a pair of adjacent walls, constituting a stage, to the next of the series, a liquid-containing vessel constituting a liquid seal and reservoir, the liquid of which encloses and seals the lower ends of the tubular members directing the flow of gas from one annular space between a pair of adjacent walls to the next, and finally to a cleans gas outlet, while liquid is poured downwardly as a continuous film along the outside walls of the tubular members whereat the swirling gas is contacted and denuded of solids as gas is passed from one annular space between a pair of adjacent walls to the next.

6. The apparatus of claim 5 wherein liquid and gas are contacted in from about three to about six stages.

7. The apparatus of claim 5 wherein the innermost tubular member provides a clean gas outlet.

8. The apparatus of claim 5 wherein the reservoir is compartmented, a different compartment being provided for each stage, this permitting different liquids to be used in each of the several stages.

9. The apparatus of claim 5 wherein the enclosing top wall is provided with clean-out manholes.

References Cited
UNITED STATES PATENTS

| | | | |
|---|---|---|---|
| 1,028,156 | 6/1912 | Trinks | 261—109 |
| 1,117,309 | 11/1914 | Bentz | 55—223 |
| 1,471,101 | 10/1923 | Cleary | 261—113 |
| 1,673,732 | 6/1928 | Brooks | 55—227X |
| 1,732,086 | 10/1929 | Flippen | 55—231X |
| 2,090,466 | 8/1937 | Bichowsky | 261—2 |
| 2,585,440 | 2/1952 | Collins | 55—235X |
| 2,687,780 | 8/1954 | Culhane | 55—349X |
| 2,840,454 | 6/1958 | Tomlinson et al. | 23—48 |
| 3,324,632 | 6/1967 | Berneike et al. | 55—236 |
| 3,409,409 | 11/1968 | Sackett | 55—238X |

FOREIGN PATENTS

| | | | |
|---|---|---|---|
| 218,734 | 2/1910 | Germany | 261—111 |

DENNIS E. TALBERT, JR., Primary Examiner

U.S. Cl. X.R.

55—238, 241, 257, 355; 261—79, 112